United States Patent

Corbett et al.

[11] Patent Number: 5,087,069
[45] Date of Patent: Feb. 11, 1992

[54] RESTRAINT SYSTEM MOUNTING

[75] Inventors: Thomas J. Corbett, Sterling Heights; Michele A. Smith, Davisburg, both of Mich.; Barry C. Worrell, Miamisburg, Ohio

[73] Assignees: General Motors Corporation, Detroit; Saturn Corporation, Troy, both of Mich.

[21] Appl. No.: 630,624

[22] Filed: Dec. 20, 1990

[51] Int. Cl.⁵ ............................................. B60R 21/22
[52] U.S. Cl. ................................. 280/731; 403/379; 403/20
[58] Field of Search ............... 280/728, 730, 731, 743; 403/379, 378, 19, 20, 324

[56] References Cited

U.S. PATENT DOCUMENTS

| | | | |
|---|---|---|---|
| 843,052 | 2/1907 | Weber | 403/379 |
| 3,342,273 | 9/1967 | Crane | 403/379 |
| 4,325,568 | 4/1982 | Clark et al. | 280/731 |

Primary Examiner—Charles A. Marmor
Assistant Examiner—Karin Tyson
Attorney, Agent, or Firm—Herbert Furman

[57] ABSTRACT

A restraint system mounting includes a plurality of hollow support members mounted within the hub portion of the steering wheel in a predetermined pattern. The support members interfit with mounting members which depend from a restraint system module and are arranged in the same pattern. Aligned recesses in the interfitting annular members receive a leg of a spring clip to releasably secure the members to each other. A key inserted through an opening in the hub portion into each pair of interfitting members cams the spring leg out of engagement with the mounting members to release the restraint system module for removal.

13 Claims, 1 Drawing Sheet

RESTRAINT SYSTEM MOUNTING

BACKGROUND OF THE INVENTION

This invention relates to the mounting of restraint systems on vehicles and more particularly to such a mounting which provides ease of assembly and disassembly of the restraint system and vehicle.

It is known to mount modular restraint systems on vehicle steering wheels by providing the support of the module with a plurality of depending hollow struts or tubular mounting members which are tapped and align with openings through a mounting plate in the hub of the steering wheel and through the hub. Threaded fasteners extend upwardly through the hub and mounting plate openings and thread into the struts to secure the struts to the mounting plate. The threaded fasteners must be threaded into and out of the struts each time that the restraint system module is assembled to and disassembled from the steering wheel.

This invention provides a restraint system mounting which permits a restraint system module to be easily assembled to and disassembled from a vehicle. While it is particularly intended for the mounting of modular driver restraint systems on vehicle steering wheels, it can be used for mounting other types of modular restraint systems on vehicles.

In its preferred embodiment, the mounting system includes a plurality of upwardly extending hollow tubular or annular support members secured within openings in a support member in the base of the hub portion of the steering wheel. The annular members open outwardly to the lower side of the hub portion through openings in the hub portion and support member. The base or mounting member of the driver restraint module includes a like number of depending cylindrical mounting members of a shape and size to be axially inserted in the annular support members to provide interfitted pairs of supporting and mounting members. The interfitted pairs of support and mounting members have aligned chordal or transverse slots or recesses which receive the spring leg of a securement to releasably secure the mounting members against axial withdrawal. The securement is mounted to the annular support member and has the spring leg thereof normally biased into engagement with the ends of the annular support member recess. The spring leg is cammed out of its position within the annular support member recess when the mounting member is inserted therein and snaps back into the mounting member recess and support member recess when the recesses are aligned. Thus, the mounting system provides a blind fastening arrangement, requiring no individual fasteners, such as screws, which can be lost, no tools, and no action on the part of the assembler other than axially inserting the mounting members within respective annular support members to releasably secure the interfitted supporting and mounting members to each other. If necessary to disassemble the restraint module from the steering wheel, a key is inserted through the hub portion and support member openings into an axial slot of the mounting member which traverses the transverse recess thereof. The key cams the spring leg of the securement out of the transverse recess of the mounting member to permit axial withdrawal of the mounting member from a respective annular support member and disassembly of the restraint module from the steering wheel. The spring leg retains the key in place during withdrawal of the mounting ember to thereby permit all of the mounting members to be simultaneously withdrawn.

The primary feature of this invention is that it provides a mounting for restraint systems on vehicles which provides ease of assembly and disassembly without the use of separable fasteners or securements. Another feature is that the mounting includes interfitting supporting and mounting members on the restraint system and on the vehicle which are releasably secured to each other when interfitted without the use of tools or other action on the part of the assembler. A further feature is the annular members on the vehicle are hollow and the cylindrical members of the restraint system are inserted therein to provide pairs of interfitting supporting and mounting members which are releasably attached to each other by resilient means received in recesses thereof which align when the members are interfitted. Yet another feature is that the interfitting supporting and mounting members are disassembled by key means inserted into the interfitting annular members and displacing the resilient means from the recess of the mounting member to permit its withdrawal from the supporting and mounting support member.

These and other features will be readily apparent from the following specification and drawing wherein.

Figure 1:
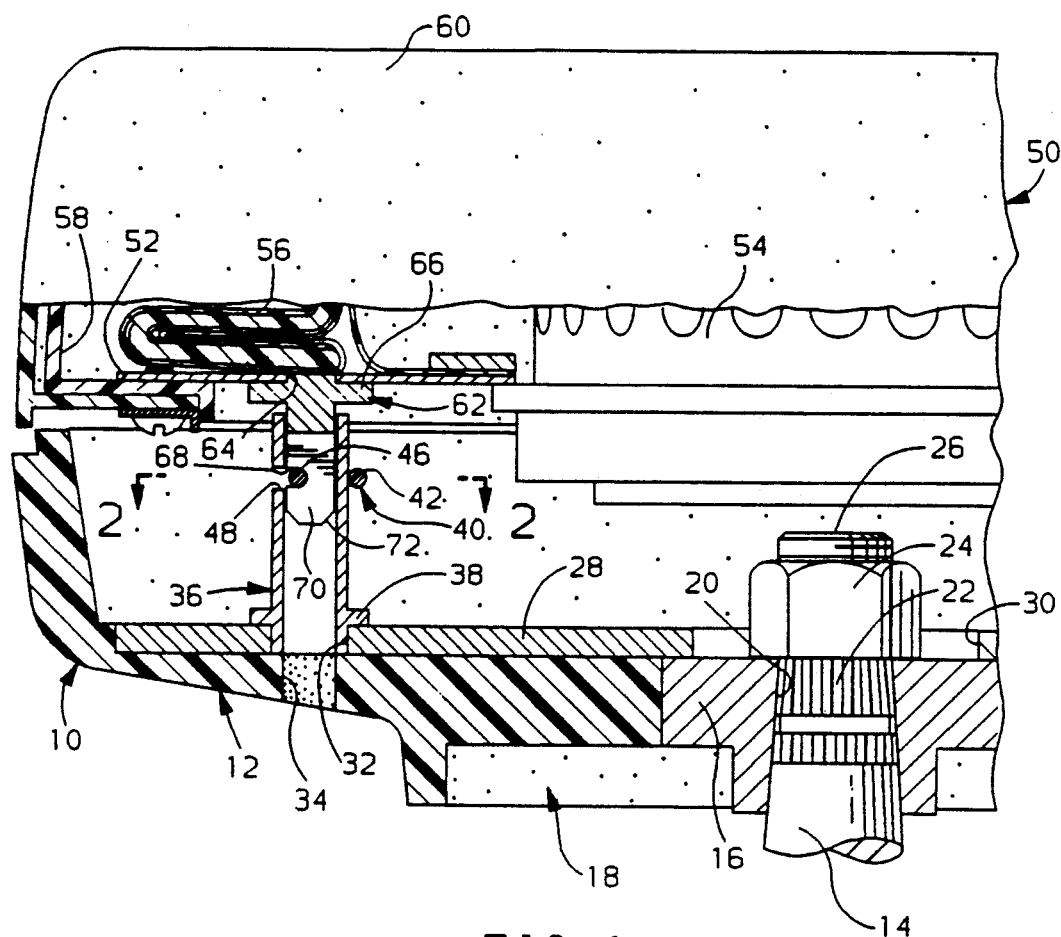
FIG. 1 is a partially broken away partial view of a vehicle steering wheel having a driver restraint module mounted thereon by a mounting according to this invention.
Figure 2:
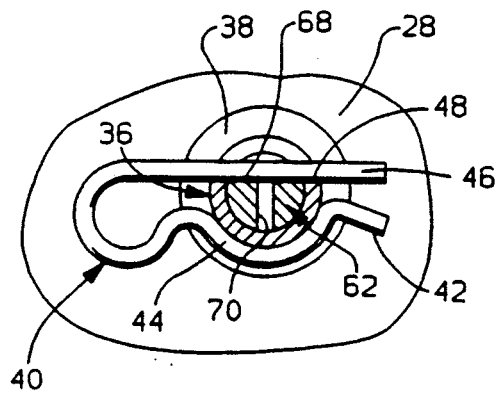
FIG. 2 is an enlarged sectional view taken along line 2—2 of FIG. 1.

Referring now to FIGS. 1 and 2 of the drawings, a vehicle steering wheel 10 includes a hub portion 12 of molded plastic material and a rim portion, not shown, connected to the hub portion by spoke portions, not shown. The hub portion is conventionally mounted on the steering shaft 14 of the vehicle by a mounting member 16 molded in the base 18 of the hub portion and having a tapered splined opening 20 receiving a like shaped upper portion 22 of the steering shaft. A nut 24 is threaded on the threaded end 26 of the steering shaft to securely mount the steering wheel to the vehicle. The base 18 of the hub portion further includes a generally rectangularly shaped molded in support member 28 having a central opening 30 around the nut 24 and four openings 32 which are slightly larger than aligned openings 34 in the base 18 of the hub portion 12. The openings 32 are located in the corners of the support member 28.

A hollow tubular or annular support member 36 is received in each of the openings 32 and has the flange 38 thereof engaging and suitably secured to the support member 28. The internal diameter of the member 36 is generally equal to that of the opening 34 with which it is aligned. A generally U-shaped securement or spring clip 40 has one leg 42 provided with an arcuate portion 44 which engages the outer surface of annular support member 36. The other linear leg 46 of the spring clip 40 is received in a transverse slot or recess 48 of the annular support member 36 in engagement with the ends of the recess as best shown in FIG. 2. The arcuate portion 44 may be secured to the annular support member 36, if desired, for loss prevention purposes.

A driver restraint system module 50 is shown and described in detail in copending applications Ser. No. 270,609 Cok et al, filed Nov. 14, 1988, Modular Occupant Restraint System, now U.S. Pat. No. 4,903,986, and Ser. No. 511,363 Miller, filed Apr. 19, 1990 Occupant Restraint System, now U.S. Pat. No. 5,009,452, both assigned to the assignee of this invention, and is also in current use in vehicles manufactured and sold by such assignee. Therefore, only a brief description of the module 50 will be given herein. The module 50 includes a generally rectangularly shaped mounting plate 52 of the general size and shape of support member 28 to which is centrally mounted an inflator 54. The inflator opens into the interior of a folded inflatable driver restraint cushion 56 which is secured to the plate 52 and deployed by pressure fluid from the inflator when the inflator receives a signal from an appropriate sensor, not shown. The inflator 54 and cushion 56 are housed within a housing 58 and covered by a cover 60. The housing 58 and cover 60 have flanges which underlie and are secured to the plate 52. The inflator 54, cushion 56, housing 58, and cover 60 are thus modularized with the plate 52 to provide the module 50. The module 50 covers the opening of the hub portion 12 of the steering wheel 10.

Four cylindrical mounting members 62 extend from the mounting plate 52, one at each corner thereof. The annular mounting members 62 fit within openings 64 in plate 52 and have their flanges 66 suitably secured to the plate 52 around the openings 64 to locate the cylindrical mounting members 62 in alignment with the annular support members 36. The cylindrical mounting members 62 are of a smaller size than the annular support members 36 so as to be inserted therein and provide respective pairs of interfitting members. Each annular mounting member 62 has a transverse slot or recess 68 which aligns with the recess 48 of a respective annular support member 36 when the annular members are interfitted. The aligned recesses 48 and 68 receive the linear leg 46 of the spring clip 40 in engagement with the bases thereof to releasably secure the interfitting annular members 36 and 62 to each other. Each member 62 also includes an axial slot 70 which traverses the recess 68 thereof, and a tapered free end 72.

When it is desired to assemble a restraint system module 50 to the steering wheel 10, the mounting members 62 are aligned with the upper ends of the annular support members 36 and inserted therein. As the tapered ends 72 of the mounting members 62 engage the linear legs 46 of the spring clips 40, they cam these legs outwardly from their normal position in engagement with the bases of the of the recesses 48 and on to the outer surfaces of the mounting members 62. As soon as the recesses 68 of the mounting members 62 come into alignment with the recesses 48 of the annular support members, the legs 46 of the spring clips spring back into the pairs of aligned recesses to releasably secure the interfitting annular and cylindrical members 36 and 62 to each other.

The mounting of the restraint system module 50 on the vehicle is accomplished automatically without the use of separable fasteners, such as screws or other threaded fasteners which can be lost, and without requiring tools to be inserted through the openings 34 in the hub portion 12 of the steering wheel 10. The mounting of this invention thus provides a blind fastening arrangement with maximum ease of assembly.

Figure 3:
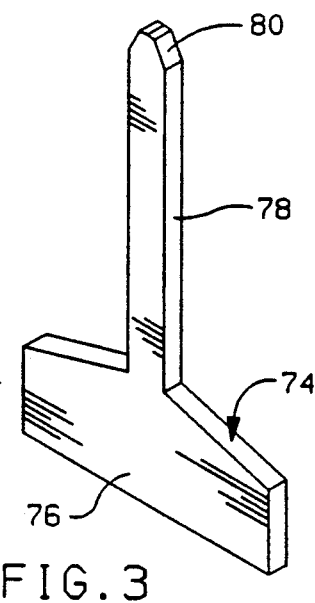
FIG. 3 is a perspective view of a key.

A flat key 74, shown in FIG. 3 is used to disassemble the module 50 from the steering wheel 10. The key 74 Includes a head 76 and a shank 78 having a shape generally the same as that of the slot 70, although with slightly less dimensions. When it is desired or necessary to disassemble the restraint system module 50 from the vehicle, the shank 78 of a key 74 is inserted into the annular member 36 through each opening 34 into the slot 70 of each cylindrical mounting member 62. As the tapered end 80 of the key engages the linear leg 46 of the spring clip 40, it cams the leg outwardly of the recess 68 and into the recess 48 to release the mounting member 62 from the annular support member 36. Once all of the mounting members 62 have been released, the module 50 can be pulled upwardly or disassembled from the steering wheel 10 to withdraw the mounting members 62 from the annular support members 36. Once manually inserted into slot 70, the key 74 will be held in place by the spring leg 46 until it is manually withdrawn to allow the spring leg 46 to spring back into its normal position in engagement with the base of recess 48. Thus, each key 74 can be manually inserted and the restraint system module 50 disassembled without having to hold the keys 74. This provides for ease of disassembly of the restraint system module 50.

Thus this invention provides a mounting for modular restraint systems which has ease of assembly and disassembly and does not require the use of any individual or separable fasteners which can be lost or the use of tools to assemble and disassemble the restraint system from its support on the vehicle.

The embodiments of the invention in which an exclusive property or privilege is claimed are defined as follows:

1. In combination with a vehicle steering wheel having a hub portion, a restraint system mounting comprising, a plurality of annular hollow support members mounted to the hub portion of the steering wheel in a predetermined pattern and opening outwardly of the hub portion through openings therethrough, driver restraint system including a plurality of mounting members arranged in the same pattern as the annular support members and interfitting therewith in respective pairs, resilient means mounted on one of the annular members of each pair and receivable within aligned recesses of both members of such pair to releasably secure the pairs of support and mounting members to each other, and means insertable into the members of each pair through the hub portion openings and engageable with the resilient means to displace the resilient means from the recesses of such members to permit their disengagement.

2. In combination with a vehicle, a restraint system mounting comprising, a support member mounted to the vehicle, a plurality of hollow annular support members secured to the support member in a predetermined pattern, a air bag restraint system including a plurality of mounting members arranged in the same pattern as the annular support members and being of a shape to interfit therewith in respective pairs, means providing aligned recesses in the pairs of interfitting members, resilient means located in such recesses to releasably secure the members of each pair to each other, and means engageable with the resilient means to displace such resilient means from such recesses to release the interfitting pairs of members for disengagement from each other.

3. In combination with a vehicle steering wheel having a hub portion, a restraint system mounting comprising, a plurality of hollow annular support members mounted to the hub portion of the steering wheel in a predetermined pattern and having one end thereof opening outwardly of the hub portion through respective openings therethrough, a driver restraint system including a plurality of mounting members arranged in the same pattern as the annular support members and insertable within the annular support members through the other ends thereof to provide respective pairs of interfitting support members, resilient means mounted on each annular support member of each pair and receivable within aligned transverse recesses of both members of such pair to releasably secure such pair of members to each other, and means insertable through the one end of each annular support member through a respective hub portion opening and into engagement with the resilient means to displace the resilient means from the recess of the mounting member to permit disengagement thereof from an annular support member.

4. In combination with a vehicle steering wheel having a hub portion, a restraint system mounting comprising, a plurality of hollow annular support members mounted to the hub portion of the steering wheel in a predetermined pattern and having one end thereof opening outwardly of the hub portion through respective openings therethrough, a driver restraint system including a plurality of mounting members arranged in the same pattern as the annular support members and insertable within the annular support members through the other ends thereof to provide respective pairs of interfitting support members, a securement mounted on each annular support member and including a leg resiliently biased into engagement with aligned transverse recesses of each pair of members to releasably secure such pair of members to each other, and means insertable and through a respective hub portion opening through the one end of each annular support member and into engagement with the leg of the securement to displace such leg from the recess of the mounting member and permit disengagement thereof from an annular support member.

5. The combination recited in claim 3 wherein the mounting members include guide means guiding the insertable means into engagement with the resilient means.

6. The combination recited in claim 3 wherein the mounting members include a slot traversing the recess therein and guiding the insertable means into engagement with the resilient means.

7. The combination recited in claim 3 wherein the insertable means includes a key insertable into the mounting means and the mounting means includes a guide means receiving and guiding the key into engagement with the resilient means.

8. The combination recited in claim 3 wherein the resilient means includes a mounting leg retained by the annular support member and a latching leg received in the aligned recesses of the interfitting support and mounting members.

9. The combination recited in claim 3 wherein the resilient means includes a generally U-shaped spring securement having one leg thereof retained to the annular support member and the other leg thereof received in the aligned recesses of the support and mounting members.

10. The combination recited in claim 3 wherein the mounting member includes a body portion insertable into the other end of the annular support member and provided with an axial slot extending partially therethrough from the free end thereof, the slot traversing the recess of other mounting member and guiding the insertable means into engagement with the resilient means.

11. The combination recited in claim 10 wherein the insertable means includes a key having a shank portion insertable into the slot and engageable with the resilient means.

12. The combination recited in claim 11 wherein the resilient means includes a linear leg of a securement resilientlY biased into engagement with the aligned recesses.

13. The combination recited in claim 11 wherein the insertable means includes a generally U-shaped spring securement having one leg retained to the annular support member and the other leg thereof resiliently biased into engagement with the aligned recesses.

* * * * *